Feb. 24, 1931.  A. F. HAHUS  1,794,228
TRAP
Filed April 19, 1929  3 Sheets-Sheet 3
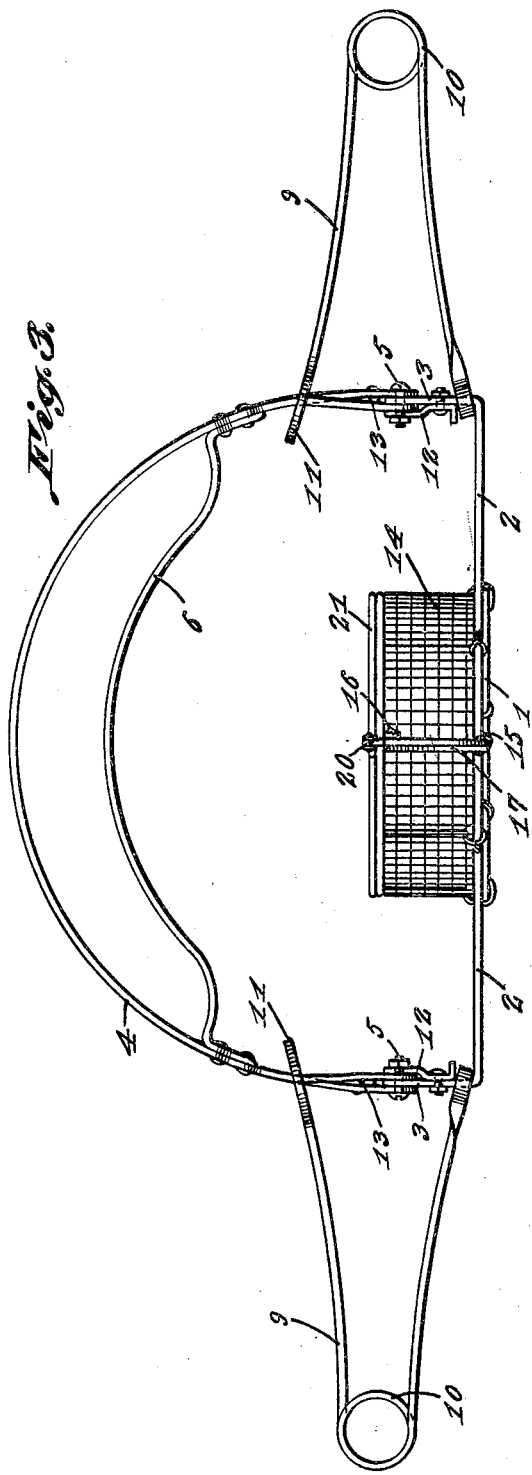
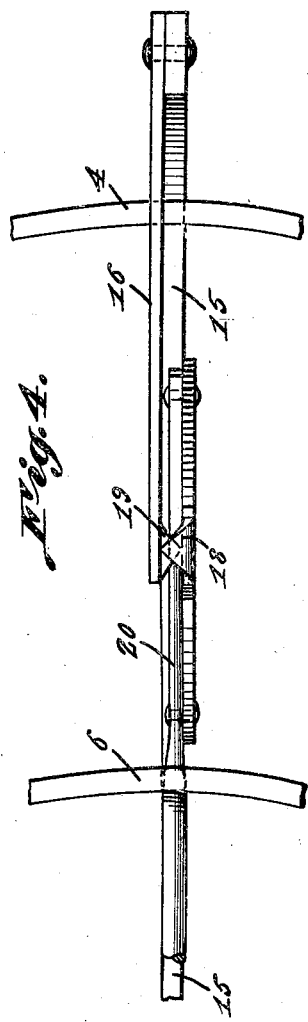
A. F. Hahus, INVENTOR
BY Victor J. Evans
ATTORNEY Patented Feb. 24, 1931

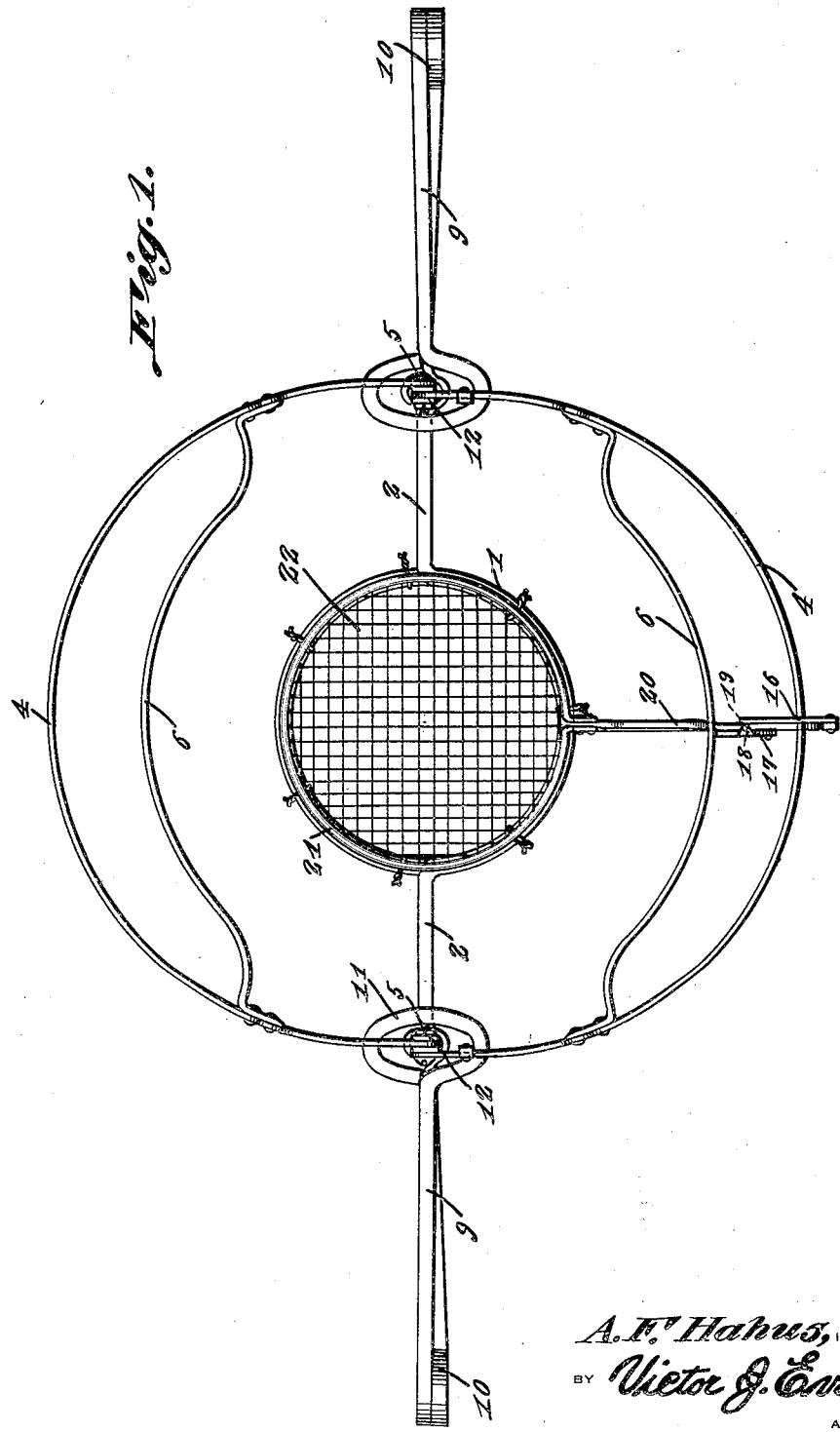

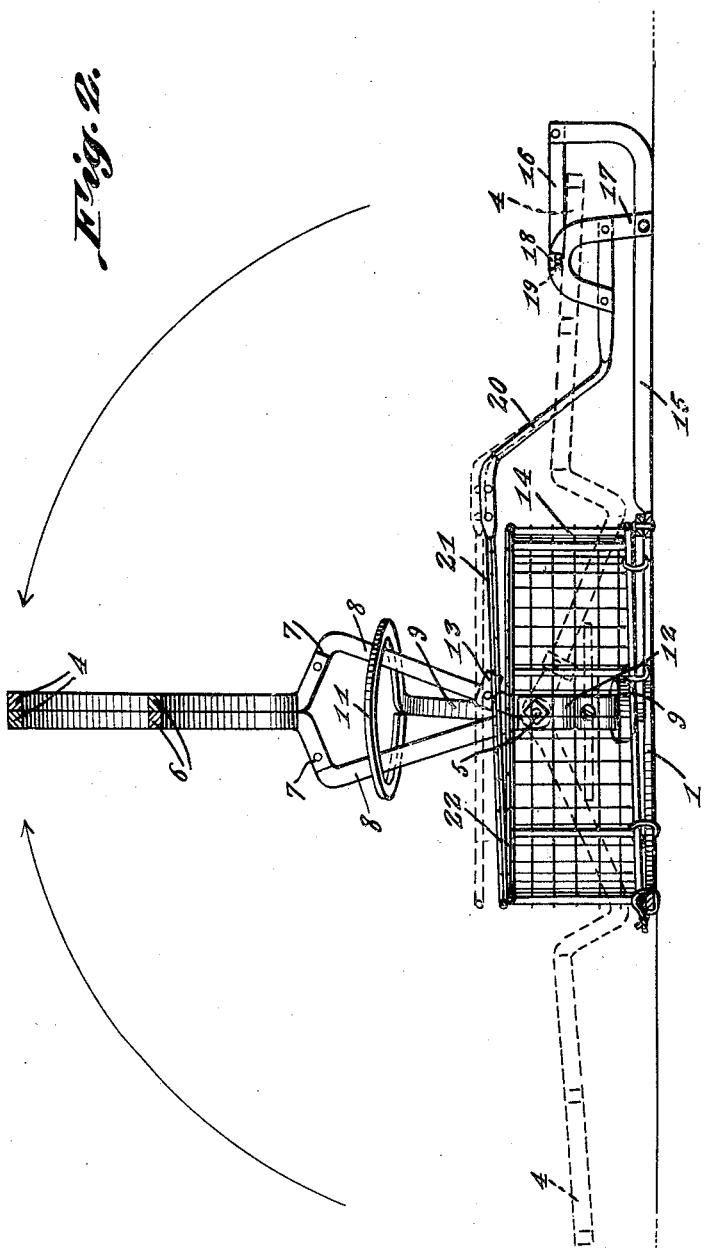

1,794,228

UNITED STATES PATENT OFFICE

ALVIN F. HAHUS, OF ORIOLE, INDIANA, ASSIGNOR OF ONE-HALF TO JOSEPH M. HIRSCH, OF CANNELTON, INDIANA

TRAP

Application filed April 19, 1929. Serial No. 356,459.

This invention relates to a trap for catching hawks, owls and the like, the general object of the invention being to provide a trap with wide jaws, each jaw being formed of two portions whereby the area of the jaw is increased so that the trap will be effective in catching large birds and also to so form the jaws, the springs and the trigger that the trap will have a quick closing movement, which enables it to catch birds attempting to reach the bait.

A further object of the invention is to provide a cage-like holder for the bait so that live bait, such as a chicken, can be used.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the trap in set position.

Figure 2 is an end view with parts in section, the trap being shown in open position in dotted lines and in closed position in full lines.

Figure 3 is an elevation with the trap closed.

Figure 4 is a detail plan view, showing the trigger means for the trap.

In these views, the numeral 1 indicates a ring-shaped base formed with the arms 2 which extend from opposite sides of the ring, with their ends bent upwardly, as at 3. The jaws 4 have their ends pivotally connected with the upright portions 3, as shown at 5, and the ends of the jaws are spaced apart to receive the uprights between them. Each jaw is composed of a strip of material bent into bowed shape, with a second strip 6 also of bowed shaped having its ends connected with the first strip in such a manner that the strip 6 is spaced inwardly from the major portion of the jaw, thus increasing the area of the gripping part of the jaw so that the jaws will be effective in catching birds, such as hawks.

Adjacent each end of each jaw, the jaw is formed with an offset part 7 and from this offset part, the jaw extends diagonally to the pivotal point, as shown at 8, so that the porions 8 converge downwardly when the jaws are in closed position, as shown in Figure 2.

Each spring 9 is composed of a single strip of metal coiled at its center, as shown at 10, so as to give the strip a spring action, and the two arms formed by the diverging end portions of the strip are bent at their ends to form the eyes 11, the eye on the upper arm being much larger than that on the lower arm and this lower eye receives the lower part of each upright 3.

A strip 12 is fastened to each upright and has its lower end bent at right angles to hold the eye of the lower arm against each arm 2, so that the lower arm of each spring is held against movement. The large eye at the end of the upper arm of each spring engages the diagonally arranged parts 8 of the jaws and thus tend to hold the jaws in closed position, as shown in Figure 2. A lug 13 is fastened to the lower part of each diagonal portion 8 of one jaw and these lugs engage the large eyes of the springs when the trap is being opened so as to keep the upper arms in alignment with the lower arms and prevent lateral movement of the upper arms.

A cage 14 of circular shape is fastened to the ring 1 for receiving the bait, and I prefer to use a live chicken or the like as the bait. A lateral arm 15 extends from the ring 1 and has its outer end bent upwardly and a latch lever 16 is pivoted to this bent-up portion. A member 17 of inverted U-shape, with one limb longer than the other, has the end of its long limb pivotally connected with the arm 15 an appreciable distance from the bent-up part of said arm 15 so as to form a space for receiving one of the jaws when the trap is in open position. The upper part of this member 17 carries a projection 18 for engaging a projection 19 on the lever 16, when the lever is placed over the jaw, so as to hold said lever 16 in horizontal position and the jaws in open position. An arm 20 is fastened to the member 17 and a ring 21 is fastened to the outer end of the arm 20, this ring being covered with wire netting 22 or the like. These parts are so formed that when the trap is set, the ring and its wire netting will be arranged over the top of the cage and spaced therefrom so that when a hawk or the like attempts to strike the bait in the cage, it will hit this ring, thus forcing the arm and the member 17 downwardly so that the projection 18 will move out of engagement with the projection 19 which will release the lever 16 so that the springs can close the jaws upon the bird.

The arrangement of the springs and the jaws is such as to give a quick closing motion to the jaws and the pivoting of the jaws to the upwardly extending portions of the base will give the jaws a high reach as compared with spread of jaws.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A trap of the class described comprising a base, means for holding bait thereon, a pair of oppositely arranged arms connected with the base, a pair of jaws having their ends pivoted to the outer ends of the arms, a pair of springs for closing the jaws, a laterally extending arm connected with the base and having its outer end bent upwardly, a latch lever pivoted to the bent part, an inverted U-shaped member having the end of one limb pivoted to the lateral arm a distance from the bent-up part thereof, thereby forming a space for receiving a part of one jaw when the jaws are in open position, projections on the lever and U-shaped member for holding the lever over the jaw, an arm connected with the U-shaped member and extending over the base, a ring on the inner end of the arm and wire netting covering the ring.

In testimony whereof I affix my signature.

ALVIN F. HAHUS.